United States Patent
Kaushik et al.

(10) Patent No.: US 12,073,221 B2
(45) Date of Patent: Aug. 27, 2024

(54) CONTEXT SWITCHING METHOD AND SYSTEM FOR SWAPPING CONTEXTS BETWEEN REGISTER SETS BASED ON THREAD HALT

(71) Applicant: NXP USA, Inc., Austin, TX (US)

(72) Inventors: Arvind Kaushik, Noida (IN); Jeroen Coninx, Zoutleeuw (BE); Nishant Jain, Noida (IN)

(73) Assignee: NXP USA, INC., Austin, TX (US)

( * ) Notice: Subject to any disclaimer, the term of this patent is extended or adjusted under 35 U.S.C. 154(b) by 449 days.

(21) Appl. No.: 16/929,079

(22) Filed: Jul. 14, 2020

(65) Prior Publication Data

US 2022/0019433 A1   Jan. 20, 2022

(51) Int. Cl.
*G06F 9/38* (2018.01)
*G06F 9/30* (2018.01)
*G06F 9/46* (2006.01)

(52) U.S. Cl.
CPC ........ *G06F 9/3851* (2013.01); *G06F 9/30101* (2013.01); *G06F 9/462* (2013.01)

(58) Field of Classification Search
CPC ..... G06F 9/30101; G06F 9/3851; G06F 9/462
See application file for complete search history.

(56) References Cited

U.S. PATENT DOCUMENTS

| | | | |
|---|---|---|---|
| 6,134,653 A * | 10/2000 | Roy | G06F 9/30076 712/228 |
| 8,020,169 B2 | 9/2011 | Yamasaki | |
| 9,323,575 B1 | 4/2016 | Pho et al. | |
| 2010/0125722 A1* | 5/2010 | Hickey | G06F 9/461 712/228 |
| 2014/0282561 A1* | 9/2014 | Holt | G06F 9/4881 718/102 |

* cited by examiner

*Primary Examiner* — David J. Huisman

(57) ABSTRACT

A context switching system includes a processor and a scheduler. The processor is configured to execute a first thread. A first context associated with the first thread is stored in a register set of the processor. While the first thread is being executed, the scheduler is configured to select a second thread from a set of threads, and receive and store a second context associated with the second thread in a register set of the scheduler. The second thread is to be scheduled for execution after the first thread. The scheduler is further configured to swap the first and second contexts when the execution of the first thread is halted, thereby executing the context switching. Further, the processor is configured to execute the second thread based on the second context. While the second thread is being executed, the first context is stored in the data memory.

17 Claims, 5 Drawing Sheets

CONTEXT SWITCHING METHOD AND SYSTEM FOR SWAPPING CONTEXTS BETWEEN REGISTER SETS BASED ON THREAD HALT

BACKGROUND

The present disclosure relates generally to electronic circuits, and, more particularly, to a method and a system for executing context switching between multiple threads.

Multithreading techniques (i.e., concurrent execution of multiple threads) are widely used in computer architecture to enable sharing of resources (such as a processor). Typically, multiple threads are concurrently executed by the processor by way of context switching. Context switching corresponds to switching a first context of a first thread that is being executed by the processor, with a second context of a second thread that is to be scheduled for execution after the first thread. To enable context switching, the first context that is stored in a register set of the processor is stored in a memory that is external to the processor, and the second context that is stored in the memory is then loaded into the register set. The processor executes the second thread based on the second context. Such context switching techniques incur a significant overhead as storing the first context in the memory and loading the second context in the register set require a significant number of memory access cycles.

A conventional approach to solve the above-mentioned problem includes utilization of a context cache in the processor for storing various contexts (e.g., the second context), and enabling swapping of the first and second contexts, thereby reducing the overhead associated with context switching. However, the utilization of the context cache in the processor results in a significant increase in a size and a manufacturing cost of the processor, and a power consumed by the processor. Further, as a number of threads, and in turn, a number of contexts increase with the scalability of a system-on-chip (SoC) that includes the processor, the size and the manufacturing cost of the processor and the power consumed by the processor further increase. Therefore, there exists a need for a method and a system that solves the aforementioned problems of the existing techniques of executing context switching between multiple threads.

SUMMARY

In one embodiment, a context switching system is disclosed. The context switching system includes a processor, a data memory, and a scheduler that is coupled with the data memory and the processor. The processor includes a processing core and a first register set that is coupled with the processing core. The first register set is configured to store a first context associated with a first thread. The processing core is configured to execute the first thread based on the first context, and halt the execution of the first thread. The data memory is configured to store a set of contexts associated with a set of threads, respectively. The scheduler includes a second register set and a thread selector that is configured to select, from the set of threads, a second thread that is to be scheduled for execution after the first thread. The thread selector selects the second thread while the processing core is executing the first thread. The scheduler further includes a context controller that is coupled with the thread selector and the second register set. The context controller is configured to store, while the processing core is executing the first thread, a second context associated with the second thread in the second register set, and swap the first context stored in the first register set and the second context stored in the second register set based on the halt in the execution of the first thread. The processing core is further configured to execute the second thread based on the second context stored in the first register set. Further, while the processing core is executing the second thread, the first context is stored in the data memory.

In another embodiment, a method for executing context switching between a plurality of threads by a context switching system is disclosed. The method includes executing, by a processing core of a processor of the context switching system, a first thread of the plurality of threads based on a first context associated with the first thread. The first context is stored in a first register set of the processor. The method further includes selecting, by a thread selector of a scheduler of the context switching system from a set of threads of the plurality of threads, a second thread that is to be scheduled for execution after the first thread. The second thread is selected while the first thread is being executed. A set of contexts associated with the set of threads is stored in a data memory of the context switching system, respectively. The method further includes storing, by a context controller of the scheduler while the first thread is being executed, a second context associated with the second thread in a second register set of the scheduler. Further, the method includes halting, by the processing core, the execution of the first thread, and swapping, by the context controller, the first context stored in the first register set and the second context stored in the second register set based on the halt in the execution of the first thread. The method further includes executing, by the processing core, the second thread based on the second context that is stored in the first register set. While the second thread is being executed, the first context is stored in the data memory.

In some examples, the context switching system further includes a program memory that is configured to store the first thread and the set of threads. The processing core is further coupled with the program memory, and is further configured to retrieve the first and second threads from the program memory prior to the execution of the first and second threads, respectively.

In some examples, the data memory is further configured to store first data associated with the first thread, and set of data associated with the set of threads, respectively. The set of data includes second data associated with the second thread.

In some examples, the context switching system includes a system controller that is configured to generate a set of threshold signals indicative of a set of threshold values that is associated with the set of threads, respectively. Each threshold value of the set of threshold values is indicative of a number of data samples included in data associated with a corresponding thread of the set of threads. The system controller is further configured to generate configuration data associated with configuration of the data memory, the first thread, and the set of threads.

In some examples, the context controller is further coupled with the system controller, and is further configured to receive the configuration data from the system controller. The context controller is further configured to receive a select signal from the thread selector. The select signal is indicative of the selected second thread that is to be scheduled for execution after the first thread. The context controller is further configured to generate, based on at least one of the configuration data and the select signal, first and second requests for retrieving the second context from the data memory and storing the first context in the data memory, respectively. The first and second requests include first and second sets of addresses associated with the data memory, respectively.

In some examples, the thread selector is further configured to generate the select signal after the second thread is selected.

In some examples, the processing core is further configured to generate third and fourth requests to retrieve the first and second data from the data memory, respectively. The third and fourth requests include third and fourth sets of addresses associated with the data memory, respectively.

In some examples, the context switching system further includes a memory controller that is coupled with the data memory, the context controller, and the processing core, and is configured to receive the first and second requests from the context controller, and the third and fourth requests from the processing core. The memory controller is further configured to access, based on the first through fourth requests, the first through fourth sets of addresses of the data memory to retrieve the second context, store the first context, retrieve the first data, and retrieve the second data, respectively. The data memory is accessed such that the second context and the first data are retrieved from the data memory simultaneously, and the first context is stored in the data memory and the second data is retrieved from the data memory simultaneously. The memory controller is further configured to generate first through fourth responses to the first through fourth requests, respectively. The first, third, and fourth responses include the second context, the first data, and the second data, respectively, and the second response is indicative of the storage of the first context in the data memory. The memory controller is further configured to provide the first and second responses to the context controller and the third and fourth responses to the processing core.

In some examples, the memory controller is further configured to generate a set of status signals associated with the set of threads, respectively. Each status signal of the set of status signals is activated when a portion of data associated with a corresponding thread of the set of threads is stored in the data memory.

In some examples, the thread selector is further coupled with the memory controller, and is further configured to receive the set of status signals associated with the set of threads, respectively. The thread selector is further coupled with the system controller, and is further configured to receive the set of threshold signals indicative of the set of threshold values that is associated with the set of threads, respectively. Based on the set of status signals, the thread selector is further configured to generate a set of counts associated with the set of threads, respectively. Each count of the set of counts is incremented when a corresponding status signal of the set of status signals is activated. The second thread is selected from the set of threads when a count associated with the second thread is equal to a threshold value associated with the second thread. An equality of the count and the threshold value associated with the second thread is indicative of the storage of the second data in the data memory in entirety and an availability of the second thread for execution.

In some examples, the processing core is further configured to generate a status signal to indicate the halt in the execution of the first thread, and provide the status signal to the context controller. The context controller swaps the first and second contexts based on the status signal.

In some examples, the processing core is further configured to receive an interrupt signal. The processing core halts the execution of the first thread based on the interrupt signal.

Various embodiments of the present disclosure disclose a context switching system. The context switching system includes a processor that includes a processing core and a first register set that is coupled with the processing core. The processing core is configured to execute a first thread, and halt the execution of the first thread, whereas the first register set is configured to store a first context associated with the first thread. The context switching system further includes a data memory that is configured to store a set of contexts associated with a set of threads, respectively, and a scheduler that is coupled with the data memory and the processor. The scheduler includes a thread selector, a second register set, and a context controller that is coupled with the thread selector and the second register set. While the processing core is executing the first thread, the thread selector is configured to select, from the set of threads, a second thread that is to be scheduled for execution after the first thread, and the context controller is configured to receive and store a second context associated with the second thread in the second register set. When the processing core halts the execution of the first thread, the context controller is further configured to swap the first and second contexts in a single memory access cycle. The processing core is further configured to execute the second thread based on the second context that is stored in the first register set. Further, while the processing core is executing the second thread, the first context is stored in the data memory.

Thus, the context switching between the first and second threads is executed by swapping, in a single memory access cycle, the first context that is stored in the first register set and the second context that is stored in the second register set. As the first context and the set of contexts are stored in the data memory, a need for inclusion of a context cache in the processor of the present disclosure is eliminated. Consequently, a size and a manufacturing cost of the processor of the present disclosure are less than that of a conventional processor (i.e., a processor that includes a context cache for implementing conventional context switching techniques). Further, a power consumed by the processor of the present disclosure is less than a power consumed by the conventional processor. The storage of the first context and the set of contexts in the data memory ensures that the size and the manufacturing cost of the processor and the power consumed by the processor are unaffected by an increase in a number of threads, and in turn, an increase in a number of contexts. Hence, the scalability of the context switching system of the present disclosure (i.e., a system-on-chip on which the context switching system is included) is less complex than that of an SoC including the conventional processor. Thus, the context switching technique of the present disclosure is more efficient as compared to conventional context switching techniques.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
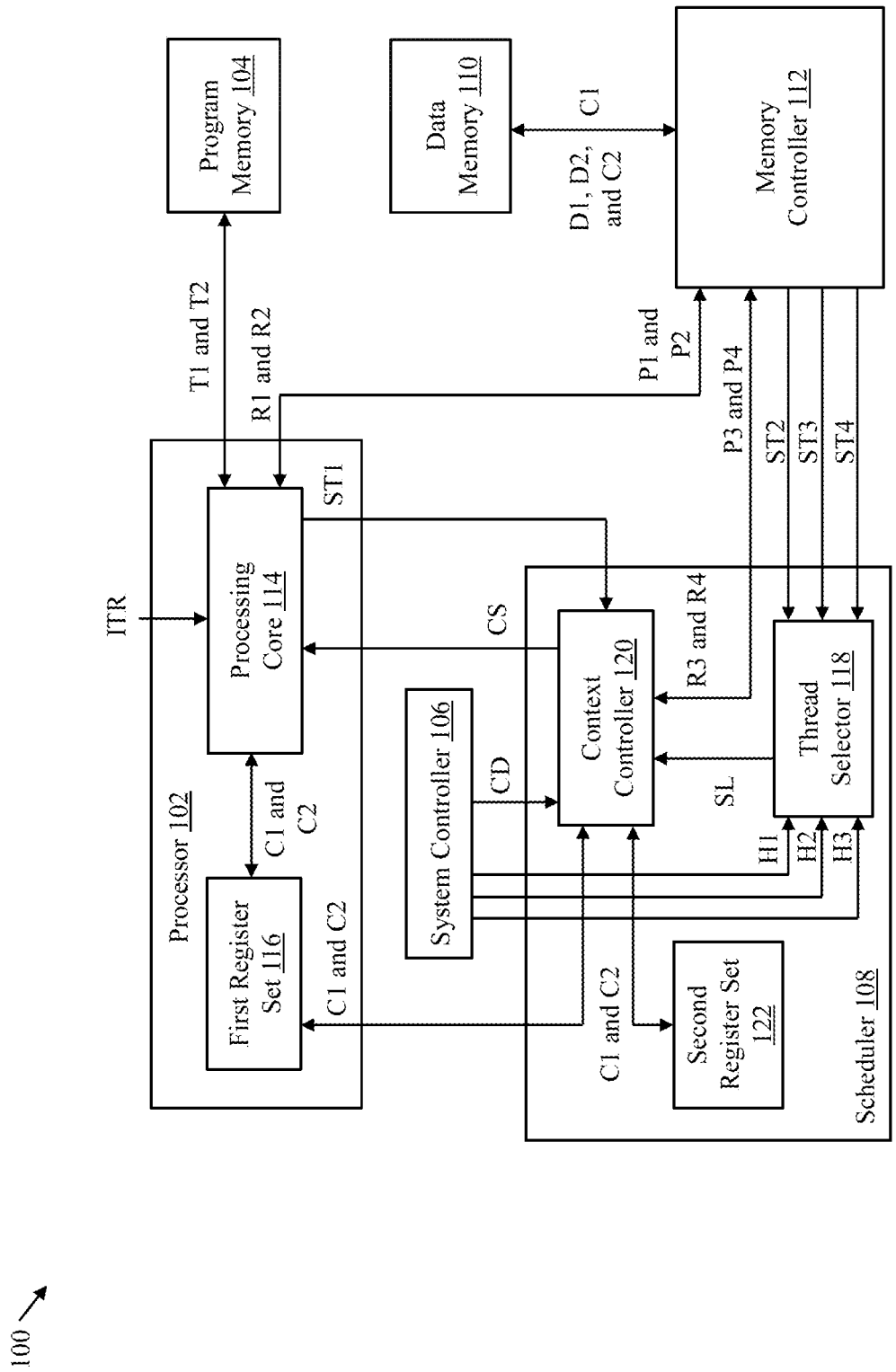
FIG. 1 illustrates a schematic block diagram of a context switching system in accordance with an embodiment of the present disclosure.

FIG. 1 illustrates a schematic block diagram of a context switching system 100 in accordance with an embodiment of the present disclosure. The context switching system 100 includes a processor 102, a program memory 104, a system controller 106, a scheduler 108, a data memory 110, and a memory controller 112. The context switching system 100 may be included on a system-on-chip (SoC) of various devices such as automotive devices, mobile devices, network devices, or the like.

The processor 102 is coupled with the program memory 104, the scheduler 108, and the memory controller 112. The processor 102 is further coupled with the data memory 110 by way of the memory controller 112, and is configured to execute various operations (i.e., thread execution operations) associated with the context switching system 100. Examples of the processor 102 may include a microcontroller, a microprocessor, an application specific integrated circuit (ASIC) processor, a reduced instruction set computer (RISC) processor, a complex instruction set computer (CISC) processor, or the like. The processor 102 includes a processing core 114 and a first register set 116 that is coupled with the processing core 114.

The processing core 114 is coupled with the program memory 104 and the memory controller 112, and is configured to execute various threads (i.e., a sequence of instructions). Prior to the execution of the threads, the processing core 114 is further configured to retrieve the threads from the program memory 104. During the execution of the threads, the processing core 114 is further configured to generate and provide various requests to the memory controller 112 to retrieve data associated with the threads from the data memory 110. The retrieved data is utilized by the processing core 114 for executing the threads. In an example, the processing core 114 is configured to execute a first thread T1 based on a first context C1 associated with the first thread T1. The first context C1 is stored in the first register set 116, and corresponds to statuses of various registers of the first register set 116. Prior to the execution of the first thread T1, the processing core 114 is further configured to retrieve the first thread T1 from the program memory 104.

During the execution of the first thread T1, the processing core 114 is configured to generate and provide a first request R1 to the memory controller 112 for retrieving first data D1, that is associated with the first thread T1, from the data memory 110. The first request R1 includes a first set of addresses associated with the data memory 110. The processing core 114 is further configured to receive a first response P1 for the first request R1 from the memory controller 112. The first response P1 includes the first data D1. The first data D1 is utilized by the processing core 114 for executing the first thread T1. The processing core 114 is further configured to halt the execution of the first thread T1. In an embodiment, the processing core 114 is further configured to receive an interrupt signal ITR, and the execution of the first thread T1 is halted based on the interrupt signal ITR. The interrupt signal ITR may be generated by an interrupt management circuit (not shown) that may be internal or external to the processor 102. In a non-limiting example, it is assumed that the interrupt management circuit is external to the processor 102. Although it is described that the execution of the first thread T1 is halted based on the interrupt signal ITR, it will be apparent to a person skilled in the art that the scope of the present disclosure is not limited to it. In various other embodiments, the execution of the first thread T1 may be halted based on various factors such as faults in the first thread T1, lapse of a predetermined time duration, or the like, without deviating from the scope of the present disclosure.

When the execution of the first thread T1 is halted, the processing core 114 is further configured to generate and provide a first status signal ST1 to the scheduler 108. The first status signal ST1 indicates that the execution of the first thread T1 is halted. Based on the first status signal ST1, the first context C1 stored in the first register set 116 is replaced by a second context C2 that is associated with a second thread T2. The second thread T2 corresponds to a thread that is to be scheduled for execution after the first thread T. The processing core 114 is further configured to receive a control signal CS from the scheduler 108. The control signal CS is indicative of the second thread T2. Based on the control signal CS, the processing core 114 is further configured to retrieve the second thread T2 from the program memory 104, and execute the second thread T2. The second thread T2 is executed based on the second context C2 that is stored in the first register set 116.

During the execution of the second thread T2, the processing core 114 is further configured to generate and provide a second request R2 to the memory controller 112 for retrieving second data D2, that is associated with the second thread T2, from the data memory 110. The second request R2 includes a second set of addresses associated with the data memory 110. The processing core 114 is further configured to receive a second response P2 for the second request R2 from the memory controller 112. The second response P2 includes the second data D2. The second data D2 is utilized by the processing core 114 to execute the second thread T2.

Although it is described that the processor 102 includes a single processing core (i.e., the processing core 114), the scope of the present disclosure is not limited to it. In various other embodiments, the processor 102 may include multiple processing cores, without deviating from the scope of the present disclosure. In such a scenario, operations executed by each processing core of the processor 102 are similar to that executed by the processing core 114.

The first register set 116 is configured to store a context of a thread (e.g., the first and second contexts C1 and C2). In an embodiment, the first register set 116 includes a general-purpose register, a floating-point register, a program counter, and a status register. Thus, the first context C1 corresponds to statuses of the general-purpose register, the floating-point register, the program counter, and the status register. The processing core 114 executes a thread (e.g., the first and second threads T1 and T2) based on the context stored in the first register set 116 (e.g., the first and second contexts C1 and C2, respectively).

The program memory 104 is configured to store various threads that are to be executed by the processor 102. For the sake of brevity, it is assumed that the program memory 104 is configured to store the first and second threads T1 and T2 and a third thread (not shown). The second thread T2 and the third thread are collectively referred to as a "set of threads". In an example, the first and second threads T1 and T2 and the third thread are stored in the program memory 104 during a boot-up of the context switching system 100. Examples of the program memory 104 may include a solid state drive (SSD), a hard disk drive (HDD), a flash memory, a removable storage device, or the like.

The system controller 106 is configured to generate various threshold signals. Each threshold signal is indicative of a threshold value that is associated with a thread stored in the program memory 104. In an example, the system controller 106 is configured to generate first through third threshold signals H1-H3 indicative of first through third threshold values that are associated with the first and second threads T1 and T2 and the third thread, respectively. The second and third threshold signals H2 and H3 are collectively referred to as a "set of threshold signals H2 and H3", and the second and third threshold values are collectively referred to as a "set of threshold values". Each threshold value of the first through third threshold values is indicative of a number of data samples included in data associated with a corresponding thread of the first and second threads T1 and T2 and the third thread. In an example, the first threshold value is indicative of a number of data samples included in the first data D1. The system controller 106 is further configured to generate configuration data CD associated with configuration of the data memory 110, the first and second threads T1 and T2, and the third thread. The configuration data CD is indicative of various addresses of the data memory 110 where data (e.g., the first and second data D1 and D2 and third data (not shown)) associated with various threads (e.g., the first and second threads T1 and T2 and the third thread, respectively) are stored, sizes of the threads, or the like.

The scheduler 108 is coupled with the processor 102, the system controller 106, and the memory controller 112. The scheduler 108 is further coupled with the data memory 110, by way of the memory controller 112, and is configured to schedule threads for execution with the processor 102. The scheduler 108 includes a thread selector 118, a context controller 120 that is coupled with the thread selector 118, and a second register set 122 that is coupled with the context controller 120.

The thread selector 118 is coupled with the system controller 106, and is configured to receive the first through third threshold signals H1-H3. The thread selector 118 is further coupled with the memory controller 112, and is further configured to receive second through fourth status signals ST2-ST4. The second through fourth status signals ST2-ST4 are associated with the first and second threads T1 and T2 and the third thread, respectively. The third and fourth status signals ST3 and ST4 are collectively referred to as a "set of status signals ST3 and ST4". Each status signal of the second through fourth status signals ST2-ST4 is activated when a portion of data associated with a corresponding thread of the first and second threads T1 and T2 and the third thread is stored in the data memory 110. In an example, the third status signal ST3 is activated when a portion of the second data D2 is stored in the data memory 110. In one embodiment, the portion of the second data D2 corresponds to one data sample of the second data D2. In such a scenario, the second threshold value is equal to the number of data samples in the second data D2. In an alternate embodiment, the portion of the second data D2 corresponds to two or more data samples of the second data D2. In such a scenario, the second threshold value is equal to the number of data samples in the second data D2 divided by the number of data samples in the portion of the second data D2.

The thread selector 118 is configured to generate various counts associated with the threads stored in the program memory 104. For example, the thread selector 118 is configured to generate first through third counts (not shown) that are associated with the first and second threads T1 and T2 and the third thread, respectively. The second and third counts are collectively referred to as a "set of counts". The thread selector 118 generates the first through third counts based on the second through fourth status signals ST2-ST4, respectively. Each count of the first through third counts is incremented when a corresponding status signal of the second through fourth status signals ST2-ST4 is activated. Further, after the count is incremented, the corresponding status signal is deactivated, and is activated again when another portion of the data associated with the corresponding thread is stored in the data memory 110. For example, the second count is incremented when the third status signal ST3 is activated. After the second count is incremented, the third status signal ST3 is deactivated, and is activated again when another portion of the second data D2 is stored in the data memory 110.

While the processing core 114 is executing the first thread T1, the thread selector 118 is further configured to select, from the second thread T2 and the third thread, a thread that is to be scheduled for execution after the first thread T1. For the sake of brevity, it is assumed that while the processing core 114 is executing the first thread T1, the thread selector 118 selects the second thread T2. The second thread T2 is selected when the second count is equal to the second threshold value. An equality of the second count and the second threshold value is indicative of the storage of the second data D2 in the data memory 110 in entirety, and an availability of the second thread T2 for execution. After the selection of the second thread T2, the thread selector 118 is further configured to generate a select signal SL that is indicative of the selected second thread T2.

The context controller 120 is further coupled with the system controller 106, and is configured to receive the configuration data CD. Further, the context controller 120 is configured to receive the select signal SL from the thread selector 118. While the processing core 114 is executing the first thread T1, the select signal SL is indicative of the second thread T2. Thus, based on the configuration data CD and the select signal SL, the context controller 120 is further configured to generate and provide a third request R3 to the memory controller 112 for retrieving the second context C2 from the data memory 110. The third request R3 includes a third set of addresses associated with the data memory 110. The context controller 120 is further configured to receive a third response P3 for the third request R3 from the memory controller 112. The third response P3 includes the second context C2. The context controller 120 is further configured to store the second context C2 in the second register set 122.

When the execution of the first thread T1 is halted, the context controller 120 is further configured to receive the first status signal ST1 from the processing core 114. Based on the first status signal ST1, the context controller 120 is further configured to swap the first context C1 stored in the first register set 116 and the second context C2 stored in the second register set 122, thereby executing context switching between the first and second threads T1 and T2. In an embodiment, the first and second contexts C1 and C2 are swapped in a single memory access cycle. After swapping the first and second contexts C1 and C2, the context controller 120 is further configured to generate and provide the control signal CS to the processing core 114. Upon reception of the control signal CS, the processing core 114 initiates the execution of the second thread T2. The context controller 120 is further configured to generate and provide, based on the configuration data CD, a fourth request R4 to the memory controller 112 for storing the first context C1 in the data memory 110. The fourth request R4 includes a fourth set of addresses associated with the data memory 110. The context controller 120 is further configured to receive a fourth response P4 for the fourth request R4 from the memory controller 112. The fourth response P4 is indicative of the storage of the first context C1 in the data memory 110. In an embodiment, an operating frequency of the context controller 120 is equal to an operating frequency of the processing core 114.

It will be apparent to a person skilled in the art that after the first context C1 is stored in the data memory 110 and while the second thread T2 is being executed, one of the first thread T1 or the third thread is selected to be scheduled for execution after the second thread T2. Further, a context associated with the selected thread is retrieved from the data memory 110 and is stored in the second register set 122.

The second register set 122 is configured to store a context of a thread that is to be scheduled for execution with the processor 102. The second register set 122 is structurally similar to the first register set 116.

The data memory 110 is configured to store data associated with each thread that is stored in the program memory 104. For example, the data memory 110 is configured to store the first data D1, the second data D2, and the third data that are associated with the first thread T1, the second thread T2, and the third thread, respectively. The second data D2 and the third data are collectively referred to as a "set of data". The data memory 110 is further configured to store a context associated with each thread that is stored in the program memory 104. For example, the data memory 110 is further configured to store the first context C1, the second context C2, and a third context (not shown) that are associated with the first thread T1, the second thread T2, and the third thread, respectively. The second context C2 and the third context are collectively referred to as a "set of contexts". Examples of the data memory 110 may include a random-access memory (RAM), a read-only memory (ROM), or the like.

The memory controller 112 is coupled with the data memory 110, and is configured to control memory access operations (e.g., read and write operations) associated with the data memory 110. Further, the memory controller 112 is coupled with the processing core 114, and is configured to receive various requests, such as the first and second requests R1 and R2. Similarly, the memory controller 112 is further coupled with the context controller 120, and is configured to receive various requests, such as the third and fourth requests R3 and R4. The memory controller 112 receives the first and third requests R1 and R3 while the processing core 114 is executing the first thread T1, and the second and fourth requests R2 and R4 while the processing core 114 is executing the second thread T2.

The memory controller 112 is further configured to access, based on the first and second requests R1 and R2, the data memory 110 (i.e., the first and second sets of addresses of the data memory 110) to retrieve the first and second data D1 and D2, respectively. Similarly, based on the third request R3, the memory controller 112 is further configured to access the data memory 110 (i.e., the third set of addresses of the data memory 110) to retrieve the second context C2 stored therein. Further, based on the fourth request R4, the memory controller 112 is further configured to access the data memory 110 (i.e., the fourth set of addresses of the data memory 110) to store the first context C1 therein. The memory controller 112 accesses the data memory 110 such that the second context C2 and the first data D1 are retrieved from the data memory 110 simultaneously, and the first context C1 is stored in the data memory 110 and the second data D2 is retrieved from the data memory 110 simultaneously.

The memory controller 112 is configured to generate the first through fourth responses P1-P4 for the first through fourth requests R1-R4, respectively. In such a scenario, the first through third responses P1-P3 include the first data D1, the second data D2, and the second context C2, respectively. Further, the fourth response P4 is indicative of the successful storage of the first context C1 in the data memory 110. The memory controller 112 is further configured to provide the first and second responses P1 and P2 to the processing core 114, and the third and fourth responses P3 and P4 to the context controller 120.

An operating frequency of the memory controller 112 is determined based on a number of processing cores included in the context switching system 100, and an operating frequency of each processing core. For the sake of ongoing discussion, it is assumed that the operating frequencies of the processing cores are equal. The operating frequency of the memory controller 112 is shown in equation (1) as:

$$fm=fp*(N+1) \quad (1)$$

where 'fm' is the operating frequency of the memory controller 112, 'fp' is the operating frequency of each processing core, and 'N' is the number of processing cores included in the context switching system 100. As the context switching system 100 of the present disclosure includes a single processing core (i.e., the processing core 114), the operating frequency of the memory controller 112 is twice that of the operating frequency of the processing core 114.

The memory controller 112 is further coupled with the thread selector 118, and is further configured to generate and provide the second through fourth status signals ST2-ST4 to the thread selector 118. Each status signal of the second through fourth status signals ST2-ST4 is activated when a portion of data associated with a corresponding thread of the first and second threads T1 and T2 and the third thread is stored in the data memory 110, and deactivated when a corresponding count is incremented. In an example, when a first portion of the second data D2 is stored in the data memory 110, the third status signal ST3 is activated. The third status signal ST3 is then deactivated when the second count is incremented, and is activated again when a second portion of the second data D2 is stored in the data memory 110.

In operation, the context controller 120 receives the configuration data CD from the system controller 106 and the thread selector 118 receives the first through third threshold signals H1-H3 from the system controller 106. Further, the first and second threads T1 and T2 and the third thread are stored in the program memory 104. In an embodiment, the configuration data CD and the first through third threshold signals H1-H3 are received by the context controller 120 and the thread selector 118, respectively, and the first and second threads T1 and T2 and the third thread are stored in the program memory 104 during the boot-up of the context switching system 100. For the sake of brevity, it is assumed that the first thread T1 is currently scheduled for execution with the processor 102.

The processing core 114 initiates the execution of the first thread T1 based on the first context C1 that is stored in the first register set 116. The first thread T1 is retrieved from the program memory 104 prior to the execution. During the execution of the first thread T1, the processing core 114 generates and provides, based on the configuration data CD, the first request R1 to the memory controller 112 for retrieving the first data D1 from the data memory 110. It will be apparent to a person skilled in the art that the first context C1 is updated during the execution of the first thread T1.

While the processing core 114 is executing the first thread T1, the memory controller 112 generates and provides the third and fourth status signals ST3 and ST4 to the thread selector 118. Based on the third and fourth status signals ST3 and ST4, the thread selector 118 generates the second and third counts, respectively. The second and third counts are incremented when the third and fourth status signals ST3 and ST4 are activated, respectively. Further, as the processing core 114 is executing the first thread T1, the thread selector 118 selects one of the second thread T2 or the third thread as a thread to be scheduled for execution after the first thread T1. For the sake of ongoing discussion, it is assumed that the second thread T2 is selected to be scheduled for execution after the first thread T1. The second thread T2 is selected when the second count is equal to the second threshold value. The thread selector 118 further generates the select signal SL that is indicative of the selected second thread T2, and provides the select signal SL to the context controller 120. The context controller 120 generates and provides, based on the select signal SL and the configuration data CD, the third request R3 to the memory controller 112 for retrieving the second context C2 from the data memory 110.

The memory controller 112 receives the first and third requests R1 and R3 from the processing core 114 and the context controller 120, respectively. The first and third requests R1 and R3 are received while the first thread T1 is being executed. Based on the first and third requests R1 and R3, the memory controller 112 accesses the first and third sets of addresses of the data memory 110 to retrieve the first data D1 and the second context C2, respectively. The first data D1 and the second context C2 are retrieved simultaneously. Further, the memory controller 112 generates and provides the first and third responses P1 and P3 to the processing core 114 and the context controller 120, respectively. The first and third responses P1 and P3 include the first data D1 and the second context C2, respectively. The first data D1 is utilized by the processing core 114 to execute the first thread T1. The context controller 120 receives and stores the second context C2 in the second register set 122.

While executing the first thread T1, the processing core 114 may receive the interrupt signal ITR. Based on the interrupt signal ITR, the processing core 114 halts the execution of the first thread T1. Further, the processing core 114 generates and provides the first status signal ST1 to the context controller 120 indicating the halt in the execution of the first thread T1. Based on the first status signal ST1, the context controller 120 swaps the first context C1 stored in the first register set 116 and the second context C2 stored in the second register set 122. The context controller 120 then generates and provides, to the processing core 114, the control signal CS that is indicative of the second thread T2 that is to be executed.

Upon reception of the control signal CS, the processing core 114 retrieves the second thread T2 from the program memory 104, and initiates the execution of the second thread T2. The processing core 114 executes the second thread T2 based on the second context C2 stored in the first register set 116. During the execution of the second thread T2, the processing core 114 generates and provides, based on the configuration data CD, the second request R2 to the memory controller 112 for retrieving the second data D2 from the data memory 110. Further, while the processing core 114 is executing the second thread T2, the context controller 120 generates and provides, based on the configuration data CD, the fourth request R4 to the memory controller 112 for storing the first context C1 in the data memory 110.

The memory controller 112 receives the second and fourth requests R2 and R4 from the processing core 114 and the context controller 120, respectively. The second and fourth requests R2 and R4 are received while the second thread T2 is being executed. Based on the second and fourth requests R2 and R4, the memory controller 112 accesses the second and fourth sets of addresses of the data memory 110 to retrieve the second data D2 and store the first context C1, respectively. The second data D2 is retrieved and the first context C1 is stored simultaneously. Further, the memory controller 112 generates and provides the second and fourth responses P2 and P4 to the processing core 114 and the context controller 120, respectively. The second response P2 includes the second data D2, whereas the fourth response P4 indicates the storage of the first context C1 in the data memory 110. The second data D2 is utilized by the processing core 114 to execute the second thread T2.

It will be apparent to a person skilled in the art that after the first context C1 is stored in the data memory 110, one of the first thread T1 or the third thread is selected to be scheduled for execution after the second thread T2. Further, a context of the selected thread is retrieved from the data memory 110 and is stored in the second register set 122. The thread selection and context retrieval are similar to the selection of the second thread T2 and the retrieval of the second context C2 as described above, respectively. Thus, while the processing core 114 is executing the second thread T2, the context (i.e., the first context C1) of the previous thread (i.e., the first thread T1) is stored in the data memory 110, a next thread (e.g., the third thread) is selected, a context (e.g., the third context) of the next thread is retrieved from the data memory, and the retrieved context is stored in the second register set 122. Similarly, while the processing core 114 is executing the first thread T1, a context of a previous thread is stored in the data memory 110, a next thread (i.e., the second thread T2) is selected, a context (i.e., the second context C2) of the next thread is retrieved from the data memory 110, and the retrieved context is stored in the second register set 122.

Although FIG. 1 describes that the program memory 104 stores the first and second threads T1 and T2 and the third thread, it will be apparent to a person skilled in the art that the scope of the present disclosure is not limited to it. In various other embodiments, more than or less than three threads may be stored in the program memory 104, without deviating from the scope of the present disclosure.

FIGS. 2A-2D, collectively, represent a flowchart 200 that illustrates a method for executing context switching between the first and second threads T1 and T2 by the context switching system 100 in accordance with an embodiment of the present disclosure.

Figure 2A:
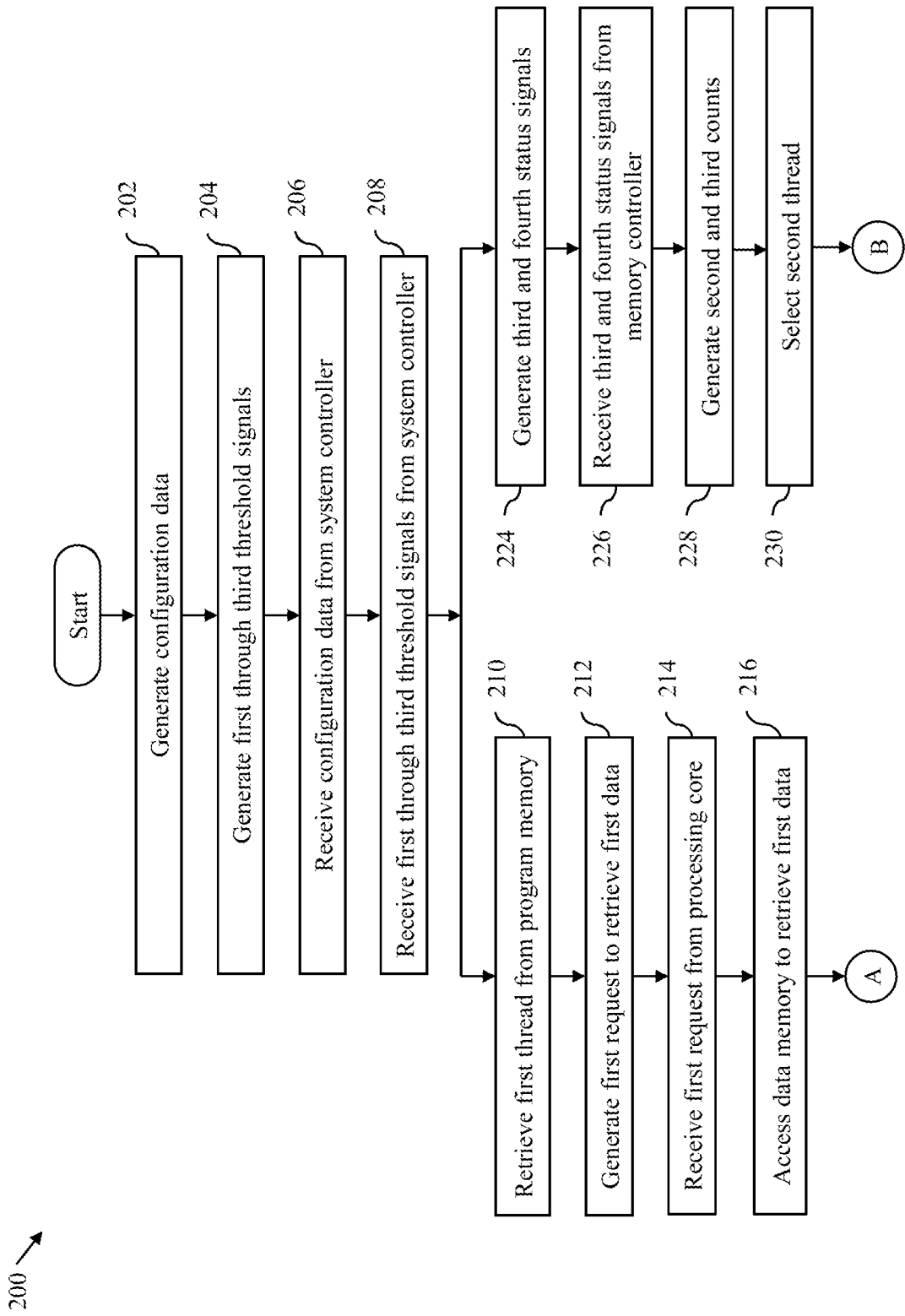
FIGS. 2A-2D, collectively, represent a flowchart that illustrates a method for executing context switching between first and second threads of FIG. 1 by the context switching system of FIG. 1 in accordance with an embodiment of the present disclosure.

Referring now to FIG. 2A, at step 202, the system controller 106 generates the configuration data CD. Further, at step 204, the system controller 106 generates the first through third threshold signals H1-H3. At step 206, the context controller 120 receives the configuration data CD from the system controller 106, and at step 208, the thread selector 118 receives the first through third threshold signals H1-H3 from the system controller 106. For the sake of ongoing discussion, it is assumed that the first thread T1 is currently scheduled for execution with the processor 102.

At step 210, the processing core 114 retrieves the first thread T1 from the program memory 104. At step 212, the processing core 114 generates the first request R1 for retrieving the first data D1 from the data memory 110, thereby initiating the execution of the first thread T1. The first request R1 is generated based on the configuration data CD. At step 214, the memory controller 112 receives the first request R1 from the processing core 114. At step 216, the memory controller 112 accesses the data memory 110 (i.e., the first set of addresses of the data memory 110), based on the first request R1, to retrieve the first data D1 stored therein.

Figure 2B:
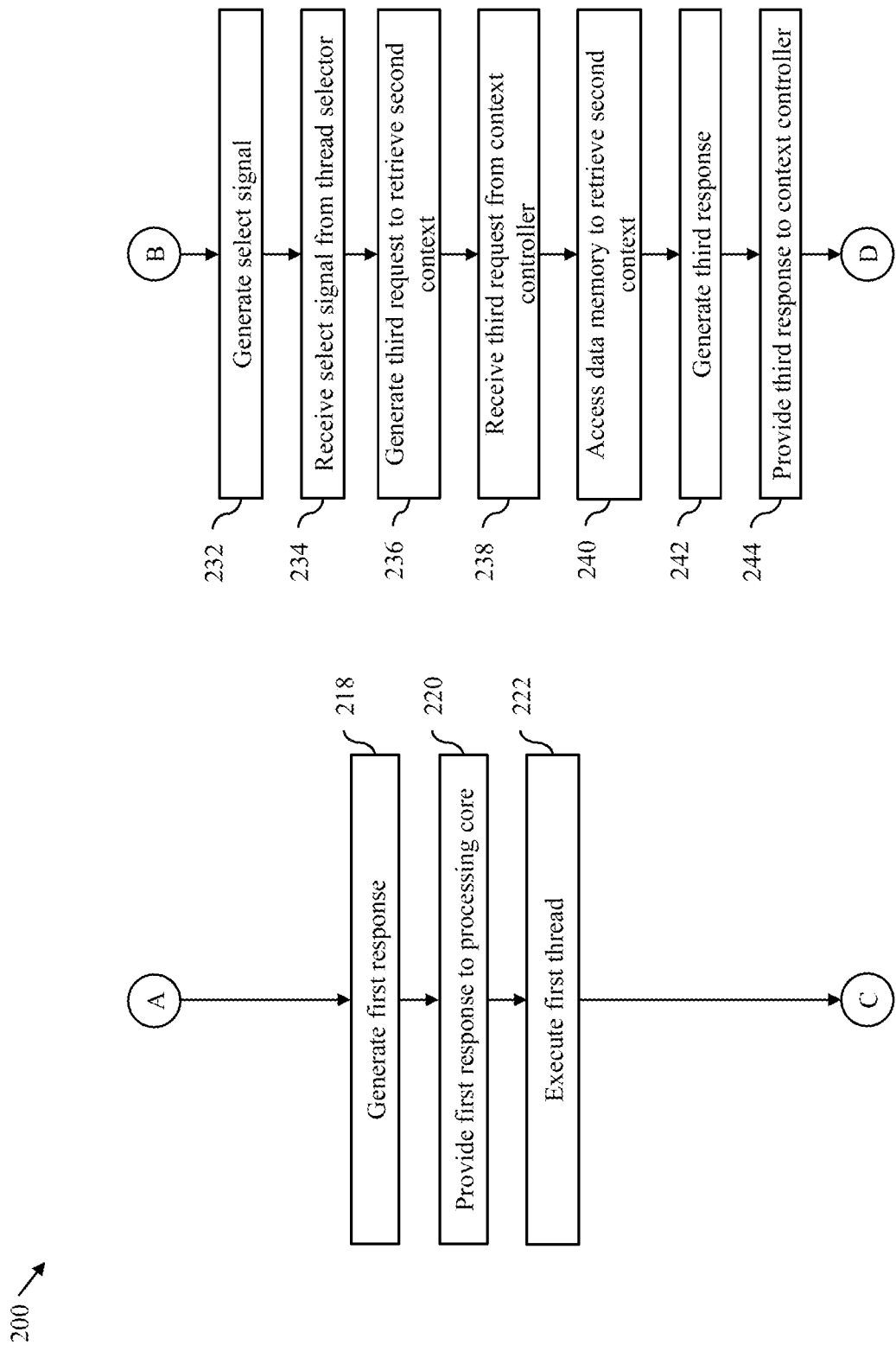

Referring now to FIG. 2B, at step 218, the memory controller 112 generates the first response P1 to the first request R1. The first response P1 includes the first data D1. At step 220, the memory controller 112 provides the first response P1 to the processing core 114. At step 222, the processing core 114 executes the first thread T1 based on the first context C1 stored in the first register set 116 and the received first data D1.

Referring back to FIG. 2A, at step 224, the memory controller 112 generates the third and fourth status signals ST3 and ST4 that are associated with the second thread T2 and the third thread, respectively. The third and fourth status signals ST3 and ST4 are activated when portions of data associated with the second thread T2 and the third thread are stored in the data memory 110, respectively. At step 226, the thread selector 118 receives the third and fourth status signals ST3 and ST4 from the memory controller 112. At step 228, the thread selector 118 generates, based on the third and fourth status signals ST3 and ST4, the second and third counts that are associated with the second thread T2 and the third thread, respectively. The second and third counts are incremented when the third and fourth status signals ST3 and ST4 are activated, respectively. At step 230, the thread selector 118 selects one of the second thread T2 or the third thread as a thread to be scheduled for execution after the first thread T1. For the sake of ongoing discussion, it is assumed that the second thread T2 is selected to be scheduled for execution after the first thread T1. The second thread T2 is selected when the second count is equal to the second threshold value.

Referring back to FIG. 2B, at step 232, the thread selector 118 generates the select signal SL that is indicative of the selected second thread T2, and at step 234, the context controller 120 receives the select signal SL from the thread selector 118. At step 236, the context controller 120 generates, based on the select signal SL and the configuration data CD, the third request R3 for retrieving the second context C2 that is associated with the second thread T2. At step 238, the memory controller 112 receives the third request R3 from the context controller 120. At step 240, based on the third request R3, the memory controller 112 accesses the data memory 110 (i.e., the third set of addresses of the data memory 110) to retrieve the second context C2. At step 242, the memory controller 112 generates the third response P3 to the third request R3, and at step 244, the memory controller 112 provides the third response P3 to the context controller 120. The third response P3 includes the retrieved second context C2.

Figure 2C:
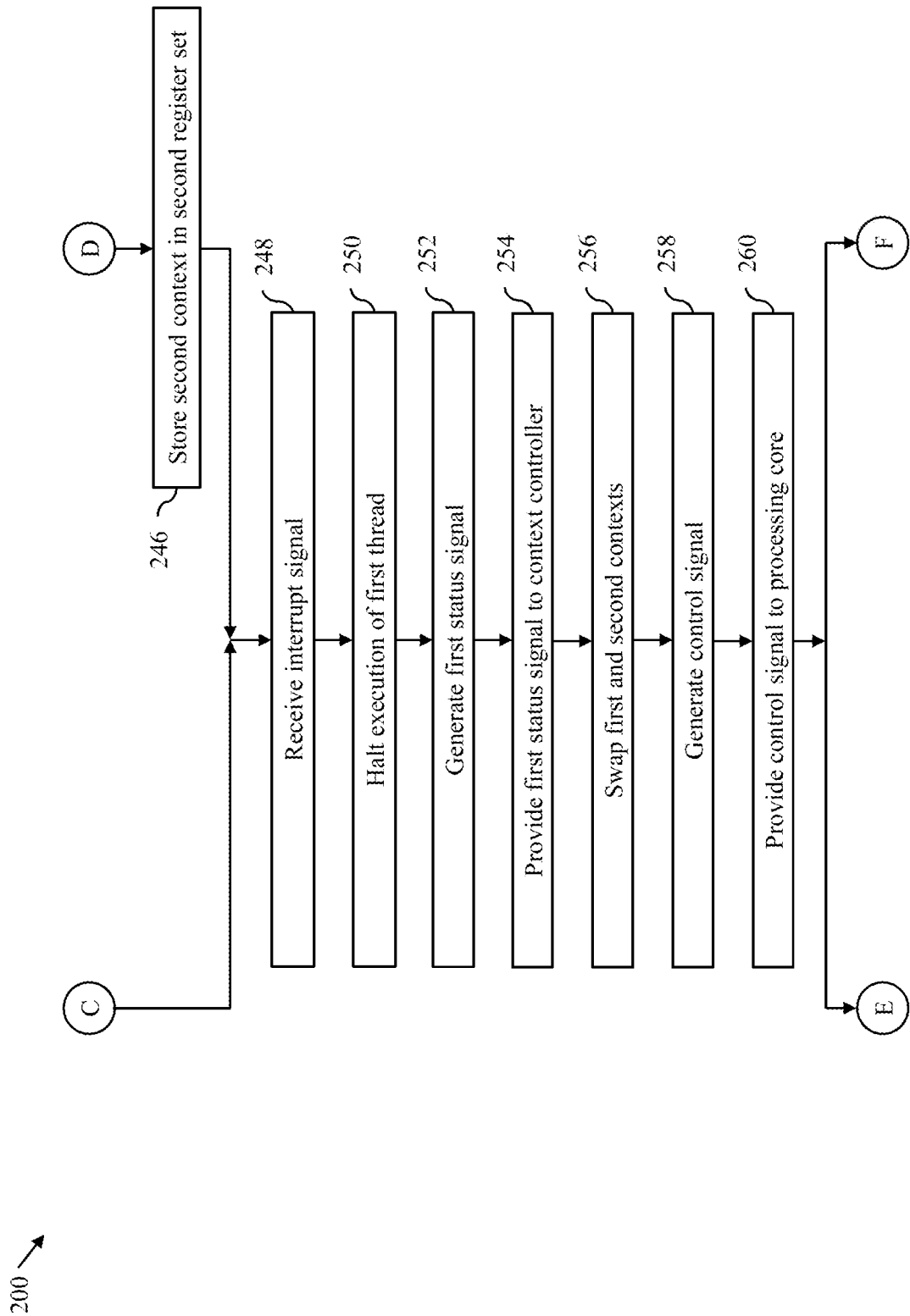

Referring now to FIG. 2C, at step 246, the context controller 120 stores the received second context C2 in the second register set 122. Steps 210-222 and 224-246 are executed simultaneously. Further, at step 248, the processing core 114 receives the interrupt signal ITR. At step 250, based on the interrupt signal ITR, the processing core 114 halts the execution of the first thread T1. At step 252, the processing core 114 generates the first status signal ST1 indicating the halt in the execution of the first thread T1, and at step 254, the processing core 114 provides the first status signal ST1 to the context controller 120. At step 256, based on the first status signal ST1, the context controller 120 swaps the first context C1 stored in the first register set 116 and the second context C2 stored in the second register set 122, thereby executing the context switching between the first and second threads T1 and T2. At step 258, the context controller 120 generates the control signal CS to indicate the second thread T2 that is to be executed, and at step 260, the context controller 120 provides the control signal CS to the processing core 114.

Figure 2D:
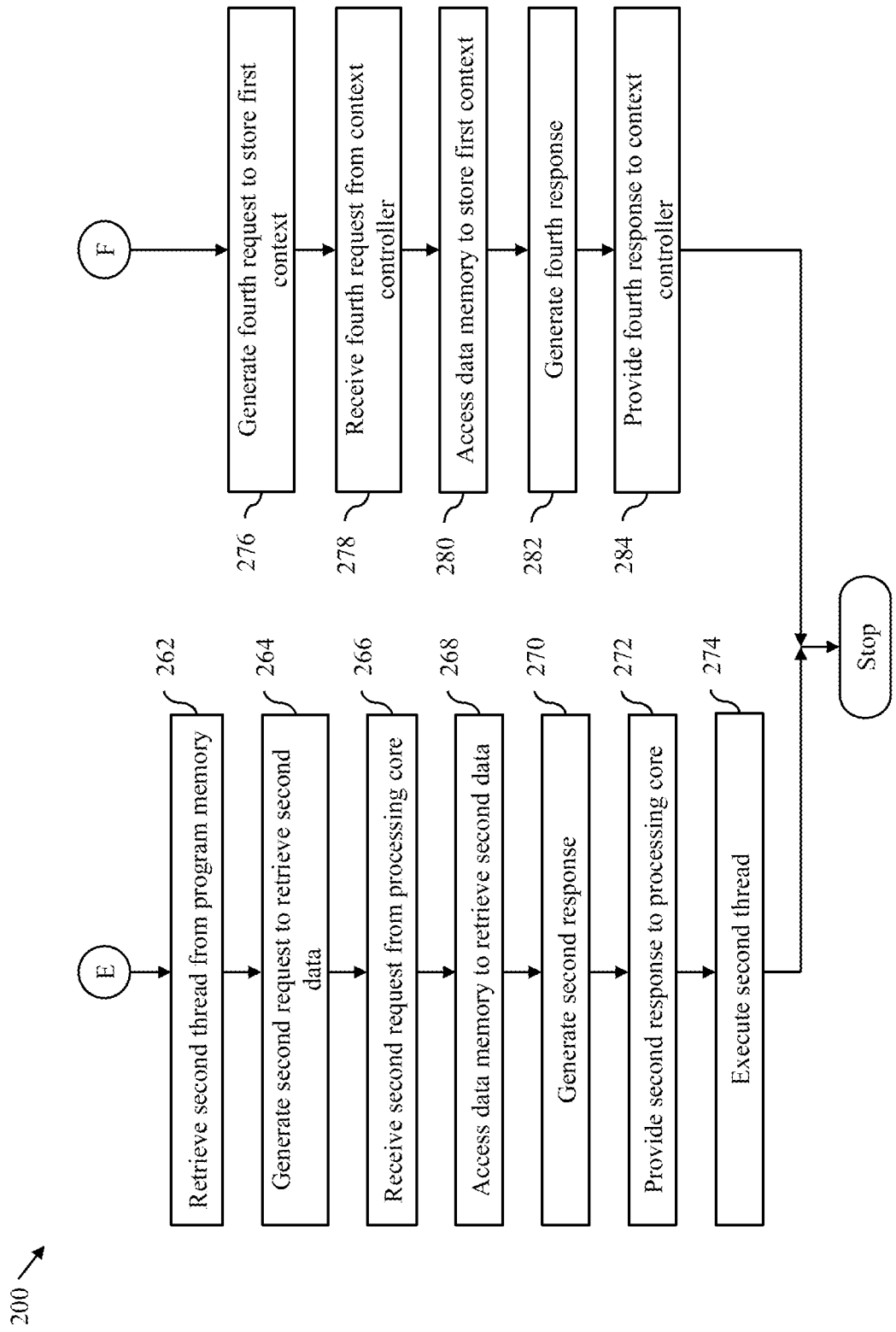

Referring now to FIG. 2D, at step 262, the processing core 114 retrieves the second thread T2 from the program memory 104. At step 264, the processing core 114 generates the second request R2 for retrieving the second data D2 from the data memory 110, thereby initiating the execution of the second thread T2. The second request R2 is generated based on the configuration data CD. At step 266, the memory controller 112 receives the second request R2 from the processing core 114. At step 268, the memory controller 112 access the data memory 110 (i.e., the second set of addresses of the data memory 110), based on the second request R2, to retrieve the second data D2 stored therein. At step 270, the memory controller 112 generates the second response P2 to the second request R2, and at step 272, the memory controller 112 provides the second response P2 to the processing core 114. The second response P2 includes the second data D2. At step 274, the processing core 114 executes the second thread T2 based on the second data D2 and the second context C2 stored in the first register set 116.

At step 276, the context controller 120 generates, based on the configuration data CD, the fourth request R4 for storing the first context C1 in the data memory 110. At step 278, the memory controller 112 receives the fourth request R4 from the context controller 120. At step 280, the memory controller 112 accesses the data memory 110 (i.e., the fourth set of addresses of the data memory 110), based on the fourth request R4, to store the first context C1 therein. At step 282, the memory controller 112 generates the fourth response P4 to the fourth request R4, and at step 284, the memory controller 112 provides the fourth response P4 to the context controller 120. The fourth response P4 is indicative of the storage of the first context C1. Steps 262-274 and 276-284 are executed simultaneously.

It will be apparent to a person skilled in the art that before the second thread T2 is selected and the second context C2 is retrieved from the data memory 110, a context of a previous thread to the first thread T1 is stored in the data memory 110. Similarly, after the first context C1 is stored in the data memory 110, one of the first thread T1 or the third thread is selected to be scheduled for execution after the second thread T2, a context of the selected thread is retrieved from the data memory 110, and the retrieved context is stored in the second register set 122. Thus, while steps 210-222 are being executed, the context of the previous thread is stored in the data memory 110 in addition to the execution of steps 224-246. Similarly, while steps 262-274 are being executed, a next thread (e.g., the third thread) is selected, a context (e.g., the third context) of the next thread is retrieved from the data memory 110, and the retrieved context is stored in the second register set 122 in addition to the execution of steps 276-284.

Thus, the context switching between the first and second threads T1 and T2 is executed by swapping, in a single memory access cycle, the first context C1 that is stored in the first register set 116 and the second context C2 that is stored in the second register set 122. As the first and second contexts C1 and C2 and the third context are stored in the data memory 110, a need for inclusion of a context cache in the processor 102 is eliminated. As a result, a size and a manufacturing cost of the processor 102 are less than that of a conventional processor (i.e., a processor that includes a context cache for implementing conventional context switching techniques). Further, a power consumed by the processor 102 is less than a power consumed by the conventional processor. The storage of the first and second contexts C1 and C2 and the third context in the data memory 110 ensures that an increase in a number of threads, and in turn, an increase in a number of contexts do not lead to an increase in the size and the manufacturing cost of the processor 102 and the power consumed by the processor. Hence, the scalability of the context switching system 100 (i.e., the SoC on which the context switching system 100 is included) is less complex than that of an SoC including the conventional processor. Thus, the context switching technique of the present disclosure is more efficient as compared to conventional context switching techniques.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. A context switching system, comprising:
a processor that includes a processing core and a first register set that is coupled with the processing core, wherein the first register set is configured to store a first context associated with a first thread, and the processing core is configured to execute the first thread based on the first context, and halt the execution of the first thread;
a data memory that is configured to store a set of contexts associated with a set of threads, respectively; and
a scheduler coupled with the data memory and the processor, the scheduler comprising:
a thread selector that is configured to select, from the set of threads, a second thread that is to be scheduled for execution after the first thread, wherein the thread selector selects the second thread while the processing core is executing the first thread;
a second register set; and
a context controller that is coupled with the thread selector and the second register set, and is configured to:
store, while the processing core is executing the first thread, a second context associated with the second thread in the second register set; and
swap the first context stored in the first register set and the second context stored in the second register set based on the halt in the execution of the first thread, wherein the processing core is further configured to execute the second thread based on the second context stored in the first register set, and wherein the first context is stored in the data memory while the processing core is executing the second thread;
wherein the data memory is further configured to store first data associated with the first thread, and a set of data associated with the set of threads, respectively, and wherein the set of data includes second data that is associated with the second thread;
wherein the system further comprises a system controller that is configured to:
generate a set of threshold signals indicative of a set of threshold values that is associated with the set of threads, respectively, wherein each threshold value of the set of threshold values is indicative of a number of data samples included in data associated with a corresponding thread of the set of threads; and
generate configuration data associated with configuration of the data memory, the first thread, and the set of threads.

2. The context switching system of claim 1, further comprising a program memory that is configured to store the first thread and the set of threads, wherein the processing core is further coupled with the program memory, and is further configured to retrieve the first and second threads from the program memory prior to the execution of the first and second threads, respectively.

3. The context switching system of claim 1, wherein the context controller is further coupled with the system controller, and is further configured to:
receive the configuration data from the system controller;
receive, from the thread selector, a select signal that is indicative of the selected second thread to be scheduled for execution after the first thread; and
generate, based on at least one of the configuration data and the select signal, first and second requests for retrieving the second context from the data memory and storing the first context in the data memory, respectively, wherein the first and second requests include first and second sets of addresses associated with the data memory, respectively.

4. The context switching system of claim 3, wherein the thread selector is further configured to generate the select signal after the second thread is selected.

5. The context switching system of claim 3, wherein the processing core is further configured to generate third and fourth requests to retrieve the first and second data from the data memory, respectively, and wherein the third and fourth requests include third and fourth sets of addresses associated with the data memory, respectively.

6. The context switching system of claim 5, further comprising a memory controller that is coupled with the data memory, the context controller, and the processing core, and is configured to:
receive the first and second requests from the context controller;
receive the third and fourth requests from the processing core;

access, based on the first through fourth requests, the first through fourth sets of addresses of the data memory to: (i) retrieve the second context, (ii) store the first context, (iii) retrieve the first data, and (iv) retrieve the second data, respectively, wherein the data memory is accessed such that the second context and the first data are retrieved from the data memory simultaneously, and the first context is stored in the data memory and the second data is retrieved from the data memory simultaneously;

generate first through fourth responses to the first through fourth requests, respectively, wherein the first, third, and fourth responses include the second context, the first data, and the second data, respectively, and the second response is indicative of the storage of the first context in the data memory; and provide the first and second responses to the context controller and the third and fourth responses to the processing core.

7. The context switching system of claim 1, further comprising a memory controller that is configured to generate a set of status signals associated with the set of threads, respectively, wherein each status signal of the set of status signals is activated when a portion of data associated with a corresponding thread of the set of threads is stored in the data memory.

8. The context switching system of claim 7, wherein the thread selector is further coupled with the system controller and the memory controller, and is further configured to:
receive, from the memory controller, the set of status signals associated with the set of threads, respectively;
receive, from the system controller, the set of threshold signals indicative of the set of threshold values that is associated with the set of threads, respectively; and
generate, based on the set of status signals, a set of counts associated with the set of threads, respectively, wherein:
each count of the set of counts is incremented when a corresponding status signal of the set of status signals is activated,
the second thread is selected from the set of threads when a count associated with the second thread is equal to a threshold value associated with the second thread, and
an equality of the count and the threshold value associated with the second thread is indicative of the storage of the second data in the data memory in entirety and an availability of the second thread for execution.

9. The context switching system of claim 1, wherein the processing core is further configured to:
generate a status signal to indicate the halt in the execution of the first thread; and
provide the status signal to the context controller, wherein the context controller swaps the first and second contexts based on the status signal.

10. The context switching system of claim 1, wherein the processing core is further configured to receive an interrupt signal, and wherein the processing core halts the execution of the first thread based on the interrupt signal.

11. A method for executing context switching between a plurality of threads by a context switching system, the method comprising:
executing, by a processing core of a processor of the context switching system, a first thread of the plurality of threads based on a first context associated with the first thread, wherein the first context is stored in a first register set of the processor;
selecting, by a thread selector of a scheduler of the context switching system from a set of threads of the plurality of threads, a second thread that is to be scheduled for execution after the first thread, wherein the second thread is selected while the first thread is being executed, and wherein a set of contexts, associated with the set of threads, is stored in a data memory of the context switching system, respectively;
storing, by a context controller of the scheduler while the first thread is being executed, a second context associated with the second thread in a second register set of the scheduler;
halting, by the processing core, the execution of the first thread;
swapping, by the context controller, the first context stored in the first register set and the second context stored in the second register set based on the halt in the execution of the first thread;
executing, by the processing core, the second thread based on the second context stored in the first register set, wherein the first context is stored in the data memory while the second thread is being executed;
wherein first data associated with the first thread and a set of data associated with the set of threads are stored in the data memory, respectively, and wherein the set of data includes second data associated with the second thread;
generating, by a memory controller of the context switching system, a set of status signals associated with the set of threads, respectively, wherein each status signal of the set of status signals is activated when a portion of data associated with a corresponding thread of the set of threads is stored in the data memory; and
generating, by a system controller of the context switching system, a set of threshold signals indicative of a set of threshold values that is associated with the set of threads, respectively, wherein each threshold value of the set of threshold values is indicative of a number of data samples included in data associated with a corresponding thread of the set of threads.

12. The method of claim 11, further comprising retrieving, by the processing core from a program memory of the context switching system, the first and second threads prior to the execution of the first and second threads, respectively.

13. The method of claim 11, further comprising:
generating, by the system controller, configuration data associated with configuration of the data memory, the first thread, and the set of threads;
receiving, by the context controller from the system controller, the configuration data;
receiving, by the context controller from the thread selector, a select signal that is indicative of the selected second thread to be scheduled for execution after the first thread; and
generating, by the context controller based on at least one of the configuration data and the select signal, first and second requests for retrieving the second context from the data memory and storing the first context in the data memory, respectively, wherein the first and second requests include first and second sets of addresses associated with the data memory, respectively.

14. The method of claim 13, further comprising generating, by the processing core, third and fourth requests for retrieving the first and second data from the data memory, respectively, wherein the third and fourth requests include third and fourth sets of addresses associated with the data memory, respectively.

15. The method of claim 11, further comprising:
receiving, by the thread selector from the memory controller, the set of status signals associated with the set of threads, respectively;
receiving, by the thread selector from the system controller, the set of threshold signals indicative of the set of threshold values that is associated with the set of threads, respectively; and
generating, by the thread selector based on the set of status signals, a set of counts associated with the set of threads, respectively, wherein:
each count of the set of counts is incremented when a corresponding status signal of the set of status signals is activated,
the second thread is selected from the set of threads when a count associated with the second thread is equal to a threshold value associated with the second thread, and
an equality of the count and the threshold value associated with the second thread is indicative of the storage of the second data in the data memory in entirety and an availability of the second thread for execution.

16. A method for executing context switching between a plurality of threads by a context switching system, the method comprising:
executing, by a processing core of a processor of the context switching system, a first thread of the plurality of threads based on a first context associated with the first thread, wherein the first context is stored in a first register set of the processor;
selecting, by a thread selector of a scheduler of the context switching system from a set of threads of the plurality of threads, a second thread that is to be scheduled for execution after the first thread, wherein the second thread is selected while the first thread is being executed, and wherein a set of contexts, associated with the set of threads, is stored in a data memory of the context switching system, respectively;
storing, by a context controller of the scheduler while the first thread is being executed, a second context associated with the second thread in a second register set of the scheduler;
halting, by the processing core, the execution of the first thread;
swapping, by the context controller, the first context stored in the first register set and the second context stored in the second register set based on the halt in the execution of the first thread; and
executing, by the processing core, the second thread based on the second context stored in the first register set, wherein the first context is stored in the data memory while the second thread is being executed;
wherein first data associated with the first thread and a set of data associated with the set of threads are stored in the data memory, respectively, and wherein the set of data includes second data associated with the second thread;

generating, by a system controller of the context switching system, configuration data associated with configuration of the data memory, the first thread, and the set of threads;
receiving, by the context controller from the system controller, the configuration data;
receiving, by the context controller from the thread selector, a select signal that is indicative of the selected second thread to be scheduled for execution after the first thread; and
generating, by the context controller based on at least one of the configuration data and the select signal, first and second requests for retrieving the second context from the data memory and storing the first context in the data memory, respectively, wherein the first and second requests include first and second sets of addresses associated with the data memory, respectively;
generating, by the processing core, third and fourth requests for retrieving the first and second data from the data memory, respectively, wherein the third and fourth requests include third and fourth sets of addresses associated with the data memory, respectively;
receiving, by a memory controller of the context switching system, the first and second requests from the context controller;
receiving, by the memory controller, the third and fourth requests from the processing core;
accessing, by the memory controller based on the first through fourth requests, the first through fourth sets of addresses of the data memory to: (i) retrieve the second context, (ii) store the first context, (iii) retrieve the first data, and (iv) retrieve the second data, respectively, wherein the data memory is accessed such that the second context and the first data are retrieved from the data memory simultaneously, and the first context is stored in the data memory and the second data is retrieved from the data memory simultaneously;
generating, by the memory controller, first through fourth responses to the first through fourth requests, respectively, wherein the first, third, and fourth responses include the second context, the first data, and the second data, respectively, and the second response is indicative of the storage of the first context in the data memory; and
providing, by the memory controller, the first and second responses to the context controller and the third and fourth responses to the processing core.

17. The method of claim 16, further comprising:
generating, by the memory controller, a set of status signals associated with the set of threads, respectively, wherein each status signal of the set of status signals is activated when a portion of data associated with a corresponding thread of the set of threads is stored in the data memory; and
generating, by the system controller, a set of threshold signals indicative of a set of threshold values that is associated with the set of threads, respectively, wherein each threshold value of the set of threshold values is indicative of a number of data samples included in data associated with a corresponding thread of the set of threads.

* * * * *